Figure 1:
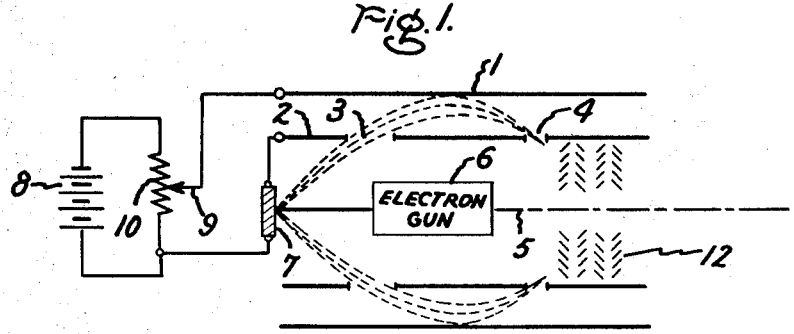

United States Patent

[11] 3,609,352

[72] Inventor Lawrence A. Harris
    Schenectady, N.Y.
[21] Appl. No. 37,967
[22] Filed May 18, 1970
[45] Patented Sept. 28, 1971
[73] Assignee General Electric Company

[54] SECONDARY ELECTRON ENERGY ANALYZING APPARATUS
    8 Claims, 2 Drawing Figs.

[52] U.S. Cl............................................. 250/49.5 AE,
    250/41.9 ME, 250/49.5 PE
[51] Int. Cl............................................ H01j 37/00,
    G01n 23/00
[50] Field of Search.................................... 250/49.5 A,
    49.5 PE, 41.9 ME

[56] References Cited
    OTHER REFERENCES

"Cylindrical Capacitor as an Analyzer" by H. Z. Sar-El from "The Review of Scientific Instruments," Vol. 38, No. 9, Sept. 1967, pgs. 1210– 1216. Q184.R5

"High Sensitivity Auger Electron Spectrometer" By P. W. Palmberg et al. from "Applied Physics Letters," Vol. 15, No. 8, Oct. 15, 1968, pgs. 254 & 255 QC1A745

Primary Examiner—William F. Lindquist
Attorneys—Paul A. Frank, John F. Ahern, Julius J. Zaskalicky, Frank L. Neuhauser, Oscar B. Waddell and Joseph B. Forman ABSTRACT: A secondary electron energy analyzer employs a pair of spaced coaxial cylinders with entrance and exit slots in the inner cylinder, the distance between the slots and the potential between the cylinders being such that secondary electrons emitted from a specimen located at a point on the axis of the cylinders enter the space between the cylinders at the entrance slot and are focused at the exit slot. An electron multiplier is located within the inner cylinder to receive the focused electrons. The outer cylinder may be split into two portions, each with its individual slots and operated at slightly different potentials, so that electrons of different energies are focused at the two exit slots, measurement of the difference in the outputs from the two portions yielding the derivative of the energy distribution curve of secondary electrons.

PATENTED SEP 28 1971 3,609,352

Inventor:
Lawrence A. Harris,
by Paul A. Frank
His Attorney.

SECONDARY ELECTRON ENERGY ANALYZING APPARATUS

This invention relates to apparatus for analyzing material using electron spectroscopic methods and in particular to material analysis apparatus of the cylindrical mirror type.

Electron spectroscopic methods of material analysis using secondary electrons, such as Auger electrons and photoelectrons, deal with extremely small currents of electrons which must be sorted according to energy. Because the currents are so small, it is important that the electrons be collected as efficiently as possible and also that the detection system provide high amplification. In U.S. Pat. No. 3,461,306 to V. L. Stout and N. R. Whetten, granted Aug. 12, 1969 and assigned to the assignee of this present invention, there is disclosed an electron probe microanalyzer which measures the derivative in energy response of Auger electrons. This apparatus employs a 127° electrostatic analyzer and the differentiation is accomplished by the use of alternating current perturbation methods. While the 127° electrostatic analyzer is capable of receiving only a very small fraction of emitted electrons, it does permit the use of an electron multiplier to provide high amplification of the minute currents.

Another type of electrostatic analyzer has been described by H. Z. Sar-el in the Review of Scientific Instruments, Vol. 38, No. 9, p. 1210, Sept. 1967. This analyzer employs a cylindrical capacitor formed by two concentric cylinders, the inner cylinder having two spaced slots normal to the cylinder axis. Secondary electrons enter the space between the cylinders through one of the slots and they exit through the second slot to focus on the axis of the cylinders.

It is the primary object of my invention to provide an electrostatic analyzer of the cylindrical capacitor type in which secondary electrons are focused at an exit slot to permit the use of electron multipliers and to leave a central area around the axis unoccupied by the detector so that an electron gun can be incorporated there.

It is another object of my invention to provide apparatus for analyzing the energies of secondary electrons which permits the use of unidirectional potentials for obtaining the derivative of the energy distribution curve of the electrons.

It is still another object of my invention to provide apparatus for analyzing the energies of secondary electrons which permits the use of both unidirectional and alternating current potentials to provide a second derivative energy distribution curve of secondary electrons.

In its broadest aspect, my invention consists in providing in a cylindrical mirror-type analyzer, an arrangement for shortening the length and outside diameter of the analyzer so that secondary electrons are focused at an exit slot and are received by an electron multiplier. In one of its forms, the outer cylinder of the cylindrical mirror analyzer consists of two halves which are operated at different unidirectional potentials so that electrons of different energies are focused at the exit slot, received by different electron multipliers, and supplied to a differential amplifier whereby the difference in output currents from electrons of different energies can be measured. In still another form, a time-varying electric potential is superimposed on the unidirectional deflection field whereby the rate of change with respect to energy of the flow of electrons of a particular energy may be measured.

The subject matter which I regard as my invention is particularly pointed out and distinctly claimed in the concluding portion of the specification.

Figure 2:
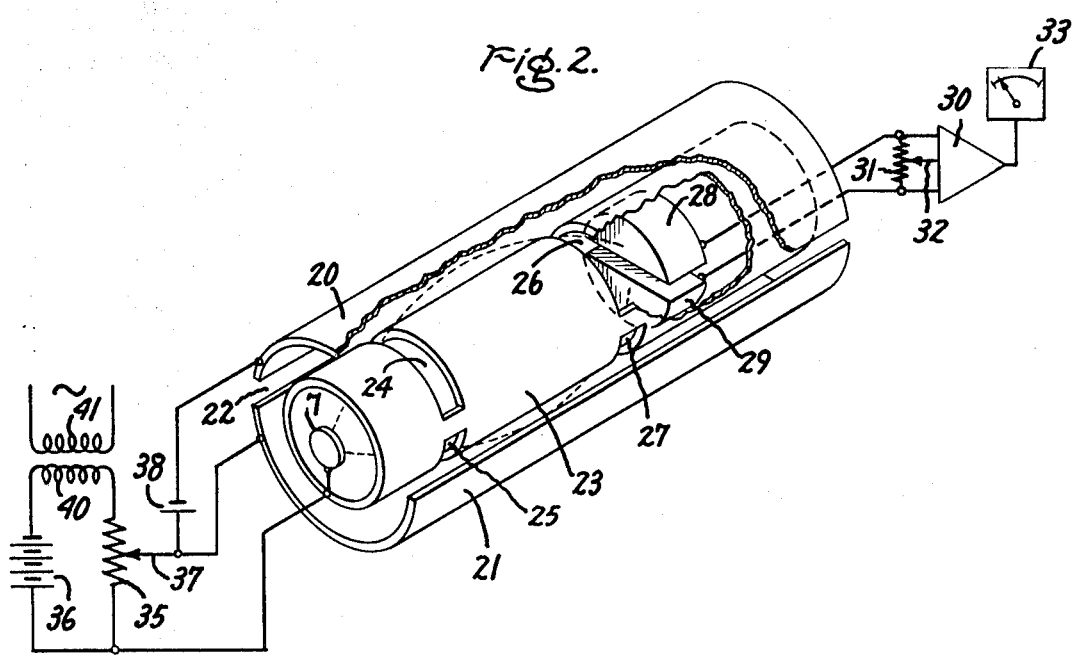

The invention, however, both as to organization and method of operation, together with further objects and advantages thereof, may best be understood by reference to the following description taken in connection with the accompanying drawings, wherein like reference characters refer to like elements and in which:

FIG. 1 illustrates schematically the components of a cylindrical analyzer embodying my invention, and FIG. 2 is a schematic perspective view, partly broken away, of a modification of the cylindrical analyzer of FIG. 1.

The electron energy analyzing apparatus of FIG. 1 comprises a pair of spaced coaxial cylinders 1,2. Outer cylinder 1 is imperforate throughout its length while inner cylinder 2 is provided with longitudinally spaced slots 3, 4, slot 3 being an entrance slot for electrons and slot 4 an exit slot. Preferably, slot 3 is covered with a suitable conductive mesh so that the electric field between cylinders 1 and 2 is not distorted by the existence of this wide slot. Slot 4 is relatively narrow and need not be covered with a mesh. Arranged along axis 5 of the coaxial cylinders is an electron gun 6 which directs a beam of electrons at a target 7, the material of whose surface is to be analyzed. The primary beam of electrons from gun 6 upon impingement on target 7 produces a substantially solid hemisphere of secondary electrons which are directed back in the general direction of the electron gun. Slot 3 is so positioned in cylinder 2 that it subtends an annular area which includes about 12 percent of the solid angle of the hemisphere into which the secondary electrons are emitted. Preferably, this area is contained in a cone between 33° and 44° with axis 5.

Sample 7 and inner cylinder 2 are maintained at substantially the same fixed unidirectional potential by being connected to a common point on a unidirectional voltage supply, such as battery 8. An electron-deflecting potential is supplied to cylinder 1 and may be obtained, for example, by connecting cylinder 1 to a variable tap 9 on a potentiometer 10 connected across batter 8.

In accordance with my invention, the distance between entrance slot 3 and exit slot 4 and the potential difference between cylinders 1 and 2 are such that secondary electrons of a certain energy passing through entrance slot 3 are deflected and focused at exit slot 4, at which point these deflected electrons reenter the region within cylinder 2. Positioned within cylinder 2 to receive the focused secondary electrons is an annular electron multiplier 12 which may comprise, for example, the dynode plates of an image orthicon.

One of the advantages of moving the focus of secondary electrons from axis 5, where it has been placed heretofore, to the exit slot in drift tube 2 is that the overall length of the cylindrical analyzer is reduced considerably and a smaller outer cylinder 1 may be used. At the same time, by reducing the size of outer cylinder 1, the smaller space between cylinders 1 and 2 reduces field disturbances in this region due to end effects and reduces the magnitude of the deflecting voltage required to focus electrons of a given energy. Another advantage is that it leaves the central area of the device unoccupied by detection apparatus so that it may be used to house the electron gun.

In the modification of my cylindrical analyzer illustrated schematically in FIG. 2, the outer cylinder comprises two substantially semicylindrical members 20, 21 which are insulated from each other by airgaps or layers of insulation 22. Inner cylinder 23 is provided with an entrance slot which comprises a plurality of diametrically opposite portions 24, 25 and an exit slot which comprises a plurality of similarly positioned portions 26, 27. As indicated, each portion 24–27 is slightly less than 180° in extent. An electron gun or other source of primary electrons is located within cylinder 23 to direct a beam of primary electrons upon target 7 supported preferably at the end of cylinder 23. At the opposite end of cylinder 23, positioned to receive output currents from the two output slots 26, 27, are a pair of electron multipliers 28, 29. The amplified currents from multipliers 28, 29 are supplied to a differential direct current amplifier 30 across which is connected a balance control 31 in the form of a resistance having a tap 32 connected to amplifier 30. The output currents of differential amplifier 30 are provided to any suitable display or utilization device such as, for example, a meter 33.

In accordance with my invention, the two semicylindrical members 20, 21 are operated at slightly different unidirectional potentials. Thus, as illustrated, cylinder 21 may be connected to a variable point by means of a tap 37 on a potentiometer 35 connected across a battery 36 while semicylindrical member 20 may be provided with a slightly different unidirectional potential from that of cylinder 21, this difference being provided by battery 38. By thus operating one-half of the analyzer with a deflection voltage which is slightly different from the other, its energy passband is shifted slightly from that of the other. The difference in the output currents of multipliers 28, 29 is thus proportional to the slope or derivative of the energy distribution curve of the secondary electrons. When coupled with differential unidirectional amplifier 30, the analyzer then provides a derivative curve which enhances the peaks of the secondary electron currents.

Further in accordance with my invention, I superimpose a time-varying voltage on the unidirectional voltages supplied to semicylindrical members 20, 21. This time-varying voltage is supplied by means of a secondary winding 40 of a transformer connected in series with potentiometer 35 and battery 36. Primary winding 41 of the transformer may be connected to any suitable alternating current source of desired frequency. By using such alternating current perturbation along with the difference amplifier, each half of the alternating current output of the analyzer is proportional to the derivative of its selected energy and the differential amplifier 30 which must now respond to alternating currents measures the difference of derivatives or the second derivative of the electron current. In so doing, the sensitivity of the analyzer is greatly enhanced for very small signals.

An important advantage of my improved analyzer is that the large collection angle and the transmission efficiency of the analyzer provide high resolution and sensitivity. In this manner, I can either obtain faster spectrum scans or reduce the primary beam current. By making my analyzer suitable for use with electron multipliers, I provide both high gain and increased overall sensitivity. At the same time, by focusing the secondary electron beam at the exit slots 26, 27, the overall size of the analyzer is reduced, thus minimizing end effects and allowing incorporation of the electron gun in the body of the analyzer.

By using a split outer cylinder in the form of cylindrical halves 20, 21, I am able to obtain the derivative curve of the secondary electron beam by unidirectional current methods with simpler and cheaper circuitry than that required by the usual alternating current methods. Furthermore, a simple electrical balance, by means of control 31, 32, can be used to compensate for differences in the gain in the two halves of the system or for any angular tilt or roughness in a specimen being analyzed.

Although specific embodiments have been shown and described, it will be appreciated that these are but illustrative and that various modifications may be made without departing from the scope and spirit of this invention as defined in the appended claims.

What I claim as new and desire to secure by Letters Patent of the United States is:

1. Apparatus for analyzing the energies of secondary electrons comprising a pair of spaced coaxial conductive cylinders, a source of primary electrons located along the axis of said cylinders, means for supporting a specimen to be examined along said axis, the inner of said cylinders having longitudinally spaced entrance and exit slots, means supplying a fixed potential to said inner cylinder, means supplying an electron-deflecting potential to the outer of said cylinders, said entrance slot being spaced relative to said supporting means so that secondary electrons having energies within a range emitted from a specimen pass through said entrance slot to enter the region between said cylinders, the distance between said entrance and exit slots and the value of the electron-deflecting potential being such that electrons of a particular energy are focused at said exit slot, electron multiplier means within said inner cylinder and positioned to receive the focused electrons, current indicating means connected to said multiplier means, said outer cylinder comprising two substantially semicylindrical members insulated from each other, said exit slot comprising two circumferentially spaced openings in said inner cylinder and means supplying different deflecting potentials to said two semicylindrical members so that electrons of different energies are focused at said two openings and supplied to said electron multiplier means.

2. The apparatus of claim 1 in which said electron multiplier means comprises a pair of electron multipliers positioned respectively to receive electrons from a different one of the two openings of said exit slot.

3. The apparatus of claim 2 in which said pair of electron multipliers are connected to a differential amplifier whereby the difference in output currents from the two openings of said exit slot can be measured.

4. The apparatus of claim 3 which includes means connected to said differential amplifier to compensate for differences in the gain through the pair of electron multipliers which means comprises a balance control connected across said differential amplifier.

5. The apparatus of claim 1 which includes means superimposing a time-varying electric potential on said deflecting potential whereby the rate of change of the energy distribution curve of electrons may be measured.

6. The apparatus of claim 5 in which said time-varying electric potential supplying means comprises a transformer having a secondary winding connected in series with the electron deflection potential means and means supplying an alternating current to the primary winding of said transformer.

7. The apparatus of claim 1 in which the deflecting potential supply to said semicylindrical members is variable.

8. The apparatus of claim 1 in which secondary electrons are emitted in a substantially solid angle from a specimen being examined and said entrance slot is positioned along the inner cylinder so that it subtends an annular area which includes approximately 12 percent of such solid angle.